United States Patent
Gignac et al.

(10) Patent No.: US 10,410,513 B2
(45) Date of Patent: Sep. 10, 2019

(54) FUSION OF NON-VEHICLE-TO-VEHICLE COMMUNICATION EQUIPPED VEHICLES WITH UNKNOWN VULNERABLE ROAD USER

(71) Applicant: Dura Operating, LLC, Auburn Hills, MI (US)

(72) Inventors: Donald Raymond Gignac, Waterford, MI (US); Aaron Evans Thompson, Grand Blanc, MI (US); Danish Uzair Siddiqui, Rochester Hills, MI (US); Rajashekhar Patil, Ypsilanti, MI (US); Gordon M. Thomas, Beverly Hills, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 132 days.

(21) Appl. No.: 15/198,607

(22) Filed: Jun. 30, 2016

(65) Prior Publication Data
US 2017/0025001 A1 Jan. 26, 2017

Related U.S. Application Data

(60) Provisional application No. 62/194,370, filed on Jul. 20, 2015.

(51) Int. Cl.
*G06K 9/00* (2006.01)
*G08G 1/04* (2006.01)
(Continued)

(52) U.S. Cl.
CPC ............. *G08G 1/04* (2013.01); *B60Q 9/008* (2013.01); *G01S 17/026* (2013.01); *G01S 17/06* (2013.01); *G01S 17/66* (2013.01); *G06K 9/00805* (2013.01); *G06K 9/6292* (2013.01); *G08G 1/0108* (2013.01); *G08G 1/056* (2013.01); *G08G 1/096716* (2013.01); *G08G 1/096791* (2013.01); *G08G 1/162* (2013.01); *G08G 1/165* (2013.01);
(Continued)

(58) Field of Classification Search
None
See application file for complete search history.

(56) References Cited

U.S. PATENT DOCUMENTS

2015/0329111 A1* 11/2015 Prokhorov ............ B60W 10/18
701/41
2017/0032402 A1* 2/2017 Patsiokas ........... G06Q 30/0266

* cited by examiner

*Primary Examiner* — Randolph I Chu
(74) *Attorney, Agent, or Firm* — Robert E. Ford; Raymond J. Vivacqua; Steven L. Crane

(57) ABSTRACT

A motor vehicle system for generating and transmitting motor vehicle imaging object data includes a communication system module positioned in a host vehicle receiving vehicle attribute data during host vehicle highway travel and preparing a fused object attribute data for transmission. An imaging device collects object imaging data representing objects within a visible detection range of the imaging device. An object detection and classification system module has an object classification sub-module used to classify the objects within the visible detection range as a vehicle type or a pedestrian and to output each as an object attribute data. A target fusion module receives the object attribute data from the object detection and classification system module, fuses the object attribute data with the vehicle attribute data to create the fused object attribute data, and forwards the fused object attribute data to the communication system module for transmission.

19 Claims, 2 Drawing Sheets

Figure 1:
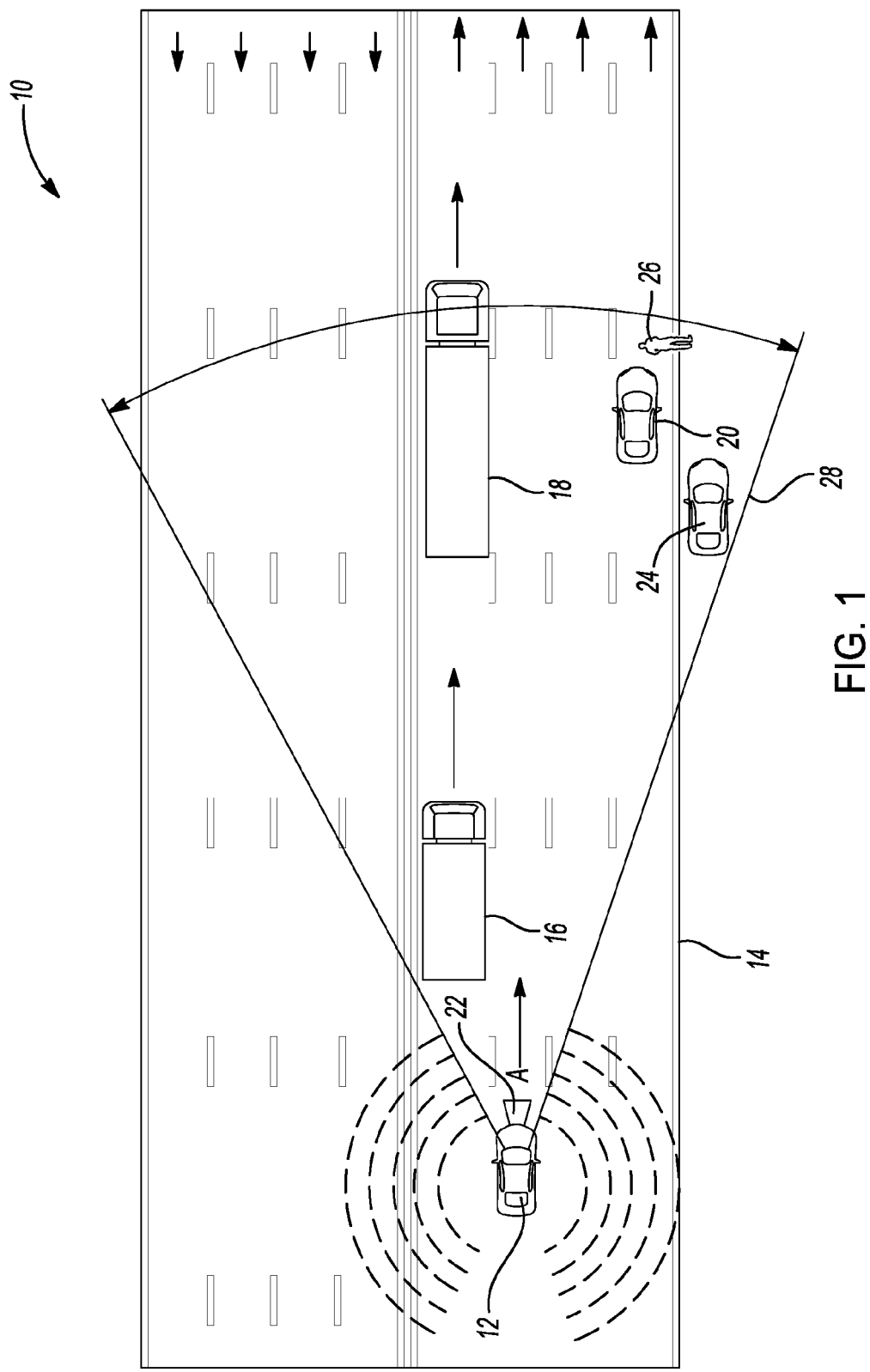

(51) Int. Cl.
*G08G 1/0967* (2006.01)
*G08G 1/16* (2006.01)
*G06K 9/62* (2006.01)
*B60Q 9/00* (2006.01)
*G01S 17/02* (2006.01)
*G01S 17/06* (2006.01)
*G01S 17/66* (2006.01)
*G08G 1/01* (2006.01)
*G08G 1/056* (2006.01)
*H04W 4/80* (2018.01)
*H04W 84/00* (2009.01)
*G01S 13/93* (2006.01)

(52) U.S. Cl.
CPC .............. *G08G 1/166* (2013.01); *H04W 4/80* (2018.02); *G01S 2013/936* (2013.01); *H04W 84/005* (2013.01)

FUSION OF NON-VEHICLE-TO-VEHICLE COMMUNICATION EQUIPPED VEHICLES WITH UNKNOWN VULNERABLE ROAD USER

CROSS REFERENCE TO RELATED APPLICATIONS

The present application claims the benefit of U.S. Provisional Patent application No. 62/194,370, filed on Jul. 20, 2015, the subject matter of which is incorporated herein by reference.

FIELD

The invention relates generally to vehicle automated tracking and notification systems for motor vehicles.

BACKGROUND

The statements in this section merely provide background information related to the present disclosure and may or may not constitute prior art.

Motor vehicle sensing systems are known which can identify to a host vehicle other proximate motor vehicles and warn the driver of the host vehicle of the other vehicle's movements which may intersect the driving path of the host vehicle. Other motor vehicle sensing systems are known which can utilize the data received from the above noted sensing system and institute changes such as to reduce a host vehicle driving speed, apply brakes, provide audio and visual warning signals, and the like to the host vehicle driver. Known systems may utilize camera systems that receive visual data related to the other vehicles and a computer system to perform calculations and generate vehicle command instructions, and LIDAR (light detection and ranging) which relies on laser light to illuminate one or more target vehicles. Other known systems include the vehicle-to-vehicle (V2V) system which allows multiple vehicles to communicate with each other using a predetermined frequency band (e.g., approximately 5.9 GHz) and communication via a dedicated short range communication (DTRC) system.

While V2V vehicle communication and sensing systems are known, not all V2V equipped vehicles have an imaging system capability. V2V equipped vehicles that lack an imaging system capability lack the capability to identify objects such as pedestrians, or to communicate imaging data with other V2V equipped vehicles. In addition, vehicles equipped with image detection systems may be limited to a field-of-view which may not be able to distinguish all objects in a host vehicle travel path. This field can therefore benefit from improved vehicle communication system designs.

SUMMARY

According to several aspects, a motor vehicle system for generating and transmitting imaging object data from a V2V equipped motor vehicle to other V2V equipped motor vehicles includes a communication system module positioned in a host vehicle receiving vehicle attribute data during host vehicle highway travel and preparing a fused object attribute data for transmission. An imaging device collects object imaging data representing objects within a visible detection range of the imaging device. An object detection and classification system module has an object classification sub-module used to classify the objects within the visible detection range of the imaging device as a vehicle type or a pedestrian and to output each as an object attribute data. A target fusion module receives the object attribute data from the object detection and classification system module, fuses the object attribute data with the vehicle attribute data to create the fused object attribute data, and forwards the fused object attribute data to the communication system module for transmission.

In one aspect, a decision module is in communication with both the communication system module and the object detection and classification system module, wherein the vehicle attribute data received by the communication system module is compared to the object attribute data generated in the object detection and classification system module.

In another aspect, a data transfer sub-module of the communication system module transmits the vehicle attribute data to at least a V2V equipped vehicle positioned within a host vehicle predefined sensing and transmission window.

In another aspect, a track data generator module is in communication with the decision module, wherein when the vehicle attribute data is not coincident with the object attribute data, the vehicle attribute data is communicated directly to the track data generator module where a situational awareness of the vehicle attribute data is monitored.

In another aspect, a message standard module formats data from the track data generator module prior to transmission by the data transfer sub-module.

In another aspect, the object detection and classification system module includes an optical scanning sub-module performing optical and stereo imaging of the objects in the host vehicle predefined sensing and transmission window.

In another aspect, the object detection and classification system module includes a detection sub-module, wherein objects are selectively identified from a data set generated by the optical scanning sub-module.

In another aspect, the object detection and classification system module includes an object classification sub-module acting to identify an object classification for each of the objects defining one of a vehicle or a pedestrian.

In another aspect, the object detection and classification system module includes a class confidence sub-module wherein the object classification is checked on a predefined periodic basis and modified if the object classification changes.

In another aspect, the object detection and classification system module includes an object range estimation sub-module in communication with the detection sub-module, the object range estimation sub-module determining a distance (range) of each of the objects with respect to the host vehicle.

In another aspect, the object detection and classification system module includes a track list identifying each of the objects identified by the detection sub-module.

According to further aspects, the communication system module includes a vehicle track data sub-module where the vehicle attribute data for a vehicle is independently identified and tracked.

According to further aspects, the object detection and classification system module includes a memory having multiple geometric objects for comparison to each object to be classified, including at least a vehicle, a truck, and a pedestrian.

In another aspect, the imaging device defines a camera.

According to further aspects, a motor vehicle system for generating and transmitting imaging object data from a V2V equipped motor vehicle to other V2V equipped motor vehicles includes a communication system module positioned in a host vehicle receiving a vehicle attribute data during host vehicle highway travel and preparing a fused object attribute data for transmission. A vehicle track data sub-module of the communication system module is used to independently track the at least one vehicle having the vehicle attribute data. An imaging device collects object imaging data representing objects within a visible detection range of the imaging device. An object detection and classification system module has an object classification sub-module used to classify the objects within the visible detection range of the imaging device as a vehicle type or a pedestrian and to output each as an object attribute data. A target fusion module receives the object attribute data from the object detection and classification system module, fuses the object attribute data with the vehicle attribute data to create the fused object attribute data, and forwards the fused object attribute data to the communication system module for transmission.

In another aspect, a track list in communication with the detection sub-module identifies each of the objects identified by the detection sub-module; and an object range estimation sub-module determines a distance (range) of each of the objects identified in the track list with respect to the host vehicle.

In another aspect, the object detection and classification system module includes a vehicle VRU sub-module performing analyses of information received from the range estimation sub-module and generating the object attribution data.

In another aspect, an object classification sub-module identifies an object classification for each of the objects defining one of a vehicle or a pedestrian; and a class confidence sub-module checks the object classification on a predefined periodic basis and modifies the object classification if the object classification changes.

In another aspect, an optical scanning system in an optical scanning sub-module performing optical and stereo imaging of a vehicle or object in a host vehicle predefined sensing and transmission window; and the imaging device defines a camera in communication with the optical scanning sub-module.

According to further aspects, a method for generating and transmitting motor vehicle imaging object data includes: positioning a communication system module in a host vehicle for receiving vehicle attribute data during host vehicle highway travel and preparing a fused object attribute data for transmission; collecting object imaging data representing objects within a visible detection range of an imaging device; classifying the objects within the visible detection range of the imaging device as a vehicle type or a pedestrian and outputting each as an object attribute data; forwarding the object attribute data from the object detection and classification system module to a target fusion module; fusing the object attribute data with the vehicle attribute data to create the fused object attribute data, and forwarding the fused object attribute data to the communication system module for transmission.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

Figure 2:
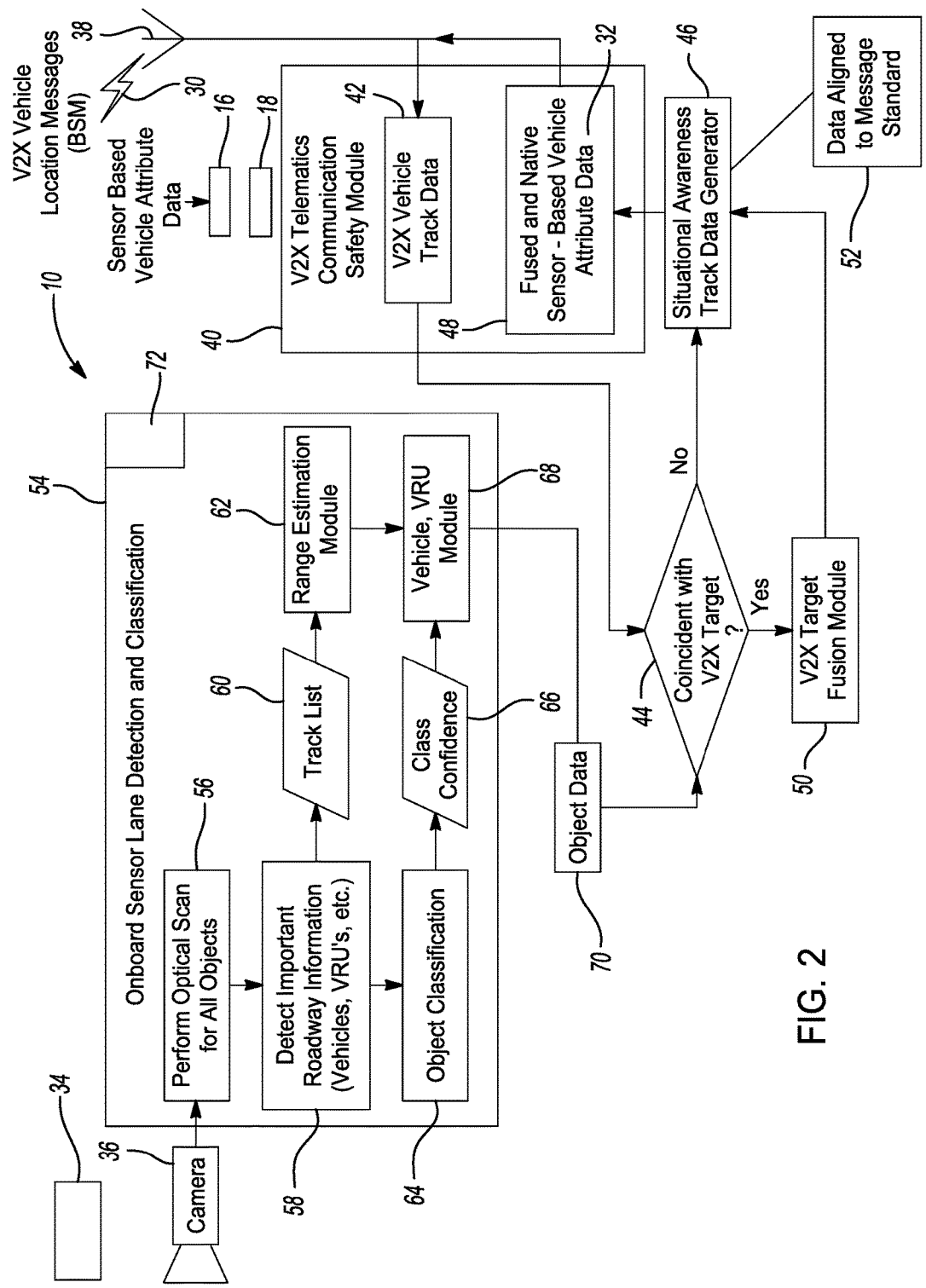

FIG. 1 is a pictorial diagram of a roadway visibility and identification range of a host vehicle using an identification system of the present disclosure; and FIG. 2 is a diagrammatic flowchart of the identification system of FIG. 1.

DETAILED DESCRIPTION

The following description is merely exemplary in nature and is not intended to limit the present disclosure, application, or uses.

With reference to FIG. 1, a system and method for providing fused object attribute data to a V2V equipped motor vehicle, and to unknown vehicles based on sensed vehicle attributes is generally indicated with reference to notification system 10. Notification system 10 transmits the fused object attribute data from a host vehicle 12 having both V2V capability and an imaging system as it travels on a road or highway 14 in a general path of travel "A" to other vehicles on the highway 14. The other vehicles can include for example a V2V-imaging equipped vehicle 16 also having an imaging system whose imaging system input may be partially blocked, a V2V equipped vehicle 18 lacking an imaging system, as well as unknown vehicles such as an unknown vehicle 20 also on the highway 14. For example, the host vehicle 12 collects vehicle attribute data and imaging data from each of the V2V-imaging equipped vehicle 16, the V2V equipped vehicle 18, and the unknown vehicle 20.

Identification system 10 can also include a vision system 22 such as a camera, a LIDAR, or a RADAR system. In this manner the information may be utilized for Advanced Driver Assist (ADAS) technology by utilizing sensors that are in an existing centralized vision processor. The vision system 22 receives information as object imaging data from the V2V-imaging equipped vehicle 16, the V2V equipped vehicle 18, a broken-down vehicle 24 on the side of the highway 14 and a pedestrian 26 in an immediate vicinity of the host vehicle 12, that are all located within a host vehicle predefined sensing and transmission window 28 of the identification system 10. The vehicle attribute data and the object imaging data when combined with object attribute data from a database are fused to create a fused object attribute data. The host vehicle 12 transmits the fused object attribute data at least to each of the V2V-imaging equipped vehicle 16, the V2V equipped vehicle 18, and the unknown vehicle 20. In the present example, only the host vehicle 12 and the V2V-imaging equipped vehicle 16 are equipped with both a V2V communication system and an imaging system.

The V2V-imaging equipped vehicle 16, even though equipped with an imaging system in addition to the V2V communication system, may have limited data available concerning the V2V equipped vehicle 18 because of its position directly behind the V2V equipped vehicle 18. In addition, the V2V-imaging equipped vehicle 16 may not have accurate data reflecting the presence of the pedestrian 26 who may be hidden or partially behind the unknown vehicle 20 or blocked by the broken down vehicle 24. The data therefore provided by the identification system 10 which is transmitted to the V2V-imaging equipped vehicle 16 as well as to the V2V equipped vehicle 18 may be beneficial in identifying objects such as the pedestrian 26, the broken down vehicle 24, and if further objects may be positioned proximate to the V2V equipped vehicle 18.

Referring to FIG. 2 and again to FIG. 1, according to several aspects, identification system 10 functions to receive vehicle attribute data 30 from other vehicles having V2V communication systems, for example the V2V-imaging equipped vehicle 16 and the V2V equipped vehicle 18. Vehicle attribute data 30 can include items such as latitude, longitude, time, heading angle, speed, lateral acceleration, longitudinal acceleration, yaw rate, throttle position, brake status, steering angle, headlight status, wiper status, external temperature, turn signal status, vehicle length, vehicle width, vehicle mass, and bumper height. Identification system 10 also functions to collect object image data 34 using an imaging device 36 such as a camera. The image data 34 collects data representing objects such as the V2V-imaging equipped vehicle 16, the V2V equipped vehicle 18, the broken-down vehicle 24 on the side of the highway 14 and the pedestrian 26 within the visible detection range of the imaging device 36. Identification system 10 further functions to transmit a fused object attribute data 32 in a predefined data format, for example such as Basic Safety Message (BSM) format, which is provided in accordance with SAE J2735 BSM.

The vehicle attribute data 30 is received via a receiving-transmitting system 38 of the host vehicle 12 such as an antenna system and is communicated to a V2X telematics communication module 40. In the V2X telematics communication module 40, the vehicle attribute data 30 is converted to V2X data format and forwarded to a vehicle track data sub-module 42 of the communication module 40, where the vehicle attribute data 30 for each vehicle within the predefined sensing and transmission window 28 is independently identified and tracked. In a following decision module 44, the vehicle attribute data 30 being tracked by the vehicle track data module 42 is compared to data generated in an object detection and classification system module 54 described in greater detail below.

The vehicle attribute data 30 is combined with object attribute data 70 and the object image data 34 by the host vehicle 12 to create the fused object attribute data 32. The fused object attribute data 32 generated by the host vehicle 12 is transmitted to at least the V2V equipped vehicle 16. The fused object attribute data 32 can also be received by any vehicle also equipped with a V2V communication system. The fused object attribute data 32 can include, for example, geometric data such as vehicle size, height, length, trajectory, speed, etc. of the first sensed V2V-imaging equipped vehicle 16. The fused object attribute data 32 is transmitted by the host vehicle 12 via the V2V network to all of the proximate vehicles, including to the V2V-imaging equipped vehicle 16 and the V2V equipped vehicle 18, and can therefore be used for travel decisions of the V2V-imaging equipped vehicle 16, V2V equipped vehicle 18, and by the unknown vehicle 20 if the unknown vehicle is also equipped with V2V system capability.

In the decision module 44, if the vehicle attribute data 30 being tracked by the vehicle track data module 42 is not coincident with the object attribute data 70 available from the object detection and classification system module 54, the program shifts to a track data generator module 46. The track data generator module 46 continues to monitor a situational awareness of the vehicle attribute data. From the track data generator module 46, vehicle attribute data 30 of the V2V-imaging equipped vehicle 16 and the V2V equipped vehicle 18 is forwarded to a data transfer sub-module 48 of the communication system module 40, from which the vehicle attribute data 30 is transmitted by the receiving-transmitting system 38 of the host vehicle 12 to at least the V2V equipped vehicle 16 and the V2V equipped vehicle 18.

If the vehicle attribute data 30 being tracked by the vehicle track data module 42 is coincident with the object attribute data 70 available from the object detection and classification system module 54, a target fusion module 50 is applied. In the target fusion module 50 vehicle attribute data from both the V2V-imaging equipped vehicle 16 and the V2V equipped vehicle 18, and the image data 34 is together fused with object attribute data 70 from the object detection and classification system module 54. The fused object attribute data 32 is thereby created prior to being forwarded to the track data generator module 46. The fused object attribute data 32 from the target fusion module 50 can also be first modified prior to being sent to the track data generator module 46. Fused object attribute data 32 is forwarded to the track data generator module 42 and then to the data transfer module 48 for transmission. Fused object attribute data 32 can also be modified to align with a message standard format, such as BSM message format. Data from the track data generator module 46 can be first formatted for transmission by forwarding the data to a message standard module 52 prior to being forwarded to the track data generator module 46 for transmission.

The object detection and classification system module 54 is an onboard module of the host vehicle 12 providing multiple sub-modules. The object detection and classification system module 54 performs multiple functions on data received for example from the visual imaging device 36 such as a camera to initially detect and classify objects in the highway including but not limited to the V2V-imaging equipped vehicle 16, the V2V equipped vehicle 18, the broken-down vehicle 24 and the pedestrian 26. Initially, an optical scanning system in an optical scanning sub-module 56 performs optical and stereo imaging of the various vehicles or objects in the host vehicle predefined sensing and transmission window 28. Data from the optical scanning sub-module 56 is communicated to a detection sub-module 58, wherein relevant objects such as vehicles and pedestrians are identified from the overall optical data set generated by the optical scanning sub-module 56.

A track list 60 of the objects identified by the detection sub-module 58 is generated and periodically updated. A range (distance) estimation of the object with respect to the host vehicle 12 is then performed for each of the objects identified in the track list 60 in a range estimation sub-module 62. The data in the range estimation is also periodically updated at a predetermined interval. In an object classification sub-module 64 object attribute data from the detection sub-module 58 is also compared to multiple exemplary geometric objects saved in a memory 72 such that each object can be classified, for example as a vehicle, a truck, a pedestrian and the like. This step identifies each vehicle or object as one of multiple types of vehicles, or identifies if the geometry more closely signifies that a pedestrian is present.

After the initial object classification step is completed in the object classification sub-module 64, because the object classification may be impacted by object range, angle of view, and host vehicle or object speed, the object classification is checked on a predefined periodic basis to identify a class confidence level in a class confidence sub-module 66. The confidence level of the identified vehicle or object can change, for example if the vehicle changes lanes thereby presenting a different view of the vehicle. Under this scenario if the identification data subsequently indicates a larger vehicle, a smaller vehicle, or that the object is actually a pedestrian, differing from the initial classification, the object classification is changed accordingly.

Following updated classification status checks, the information from the class confidence sub-module 66 and the information from the range estimation sub-module 62 is together analyzed in a vehicle-VRU sub-module 68. The output signal or object attribute data 70 generated by the vehicle-VRU sub-module 68 identifies the type of vehicle or if the object is a pedestrian, as well as other object attribute data such as range, direction of travel and velocity. This object attribute data 70 is communicated to the decision module 44 to determine the type of status signal that will be transmitted by the communication system module 40.

According to several aspects, a motor vehicle system 10 for generating and transmitting motor vehicle object data includes a communication system module 40 positioned in a host vehicle 12 receiving vehicle attribute data 30 during host vehicle highway travel and preparing a fused object attribute data 32 for transmission. An imaging device 36 collects object imaging data 70 representing objects within a visible detection range 28 of the imaging device 36. An object detection and classification system module 54 has an object classification sub-module 64 used to classify the objects within the visible detection range 28 as a vehicle type or a pedestrian and to output each as an object attribute data 70. A target fusion module 50 receives the object attribute data 70 from the object detection and classification system module 54, fuses the object attribute data 70 with the vehicle attribute data 30 to create the fused object attribute data 32, and forwards the fused object attribute data 32 to the communication system module 40 for transmission.

The description of the invention is merely exemplary in nature and variations that do not depart from the gist of the invention are intended to be within the scope of the invention. Such variations are not to be regarded as a departure from the spirit and scope of the invention.

The following is claimed:

1. A motor vehicle system for generating and transmitting imaging object data from a V2V equipped motor vehicle to other V2V equipped motor vehicles, comprising:
   a host vehicle having an imaging device collecting object imaging data representing objects within a visible detection range of the imaging device during host vehicle highway travel;
   an object detection and classification system module having an object classification sub-module used to classify the objects within the visible detection range of the imaging device as a vehicle type or a pedestrian and to output each as an object attribute data;
   a communication system module positioned in the host vehicle receiving vehicle attribute data from at least a second vehicle; and
   a target fusion module receiving the object attribute data and the vehicle attribute data, fusing the object attribute data with the vehicle attribute data together with attribute data retrieved from a database in the host vehicle to create a fused object attribute data, and forwarding the fused object attribute data to the communication system module for transmission to a third vehicle defining a V2V equipped motor vehicle, the third vehicle having limited data available concerning the objects within the visible detection range of the imaging device, the third vehicle having an imaging system receiving the object attribute data and identifying objects in the object attribute data, the third vehicle generating travel decisions incorporating the objects positioned within the visible detection range of the imaging device of the first host vehicle which are not visible to the third vehicle;
   an object classification sub-module acting to identify an object classification for each of the objects within the visible detection range defining one of a vehicle or a pedestrian; and
   a class confidence sub-module wherein the object classification is checked on a predefined periodic basis and modified if the object classification changes by a change in object range, angle of view, and host vehicle or object speed.

2. The motor vehicle system for generating and transmitting imaging object data of claim 1, further including a decision module in communication with both the communication system module and the object detection and classification system module, wherein the vehicle attribute data received by the communication system module is compared to the object attribute data generated in the object detection and classification system module.

3. The motor vehicle system for generating and transmitting imaging object data of claim 2, further including a data transfer sub-module of the communication system module, the data transfer sub-module operating to transmit the vehicle attribute data to at least the V2V equipped vehicle positioned within a host vehicle predefined sensing and transmission window.

4. The motor vehicle system for generating and transmitting imaging object data of claim 3, further including a track data generator module in communication with the decision module; wherein when the vehicle attribute data is not coincident with the object attribute data, the vehicle attribute data is communicated directly to the track data generator module where a situational awareness of the vehicle attribute data is monitored.

5. The motor vehicle system for generating and transmitting imaging object data of claim 4, further including a message standard module acting to format data from the track data generator module prior to transmission by the data transfer sub-module.

6. The motor vehicle system for generating and transmitting imaging object data of claim 1, wherein the object detection and classification system module includes an optical scanning sub-module performing optical and stereo imaging of the objects in the host vehicle predefined sensing and transmission window.

7. The motor vehicle system for generating and transmitting imaging object data of claim 6, wherein the object detection and classification system module includes a detection sub-module, wherein objects are selectively identified from a data set generated by the optical scanning sub-module.

8. The motor vehicle system for generating and transmitting imaging object data of claim 7, wherein the object classification is changed if a class confidence level of an identified object changes when the identified object changes positions thereby presenting a different view of the identified object, wherein the identified object is redefined as a larger vehicle, a smaller vehicle, or a pedestrian, differing from an initial classification of the identified object.

9. The motor vehicle system for generating and transmitting imaging object data of claim 8, wherein the object detection and classification system module includes an object range estimation sub-module in communication with the detection sub-module, the object range estimation sub-module determining a distance (range) of each of the objects with respect to the host vehicle.

10. The motor vehicle system for generating and transmitting imaging object data of claim 7, wherein the object detection and classification system module includes a track list identifying each of the objects identified by the detection sub-module.

11. The motor vehicle system for generating and transmitting imaging object data of claim 10, wherein the communication system module includes a vehicle track data sub-module where the vehicle attribute data for a vehicle is independently identified and tracked.

12. The motor vehicle system for generating and transmitting imaging object data of claim 7, wherein the object detection and classification system module includes a memory having multiple geometric objects for comparison to each object to be classified, including at least a vehicle, a truck, and a pedestrian.

13. The motor vehicle system for generating and transmitting imaging object data of claim 1, wherein the imaging device defines a camera.

14. A motor vehicle system for generating and transmitting imaging object data from a V2V equipped motor vehicle to other V2V equipped motor vehicles, comprising:
   a communication system module positioned in a host vehicle receiving a vehicle attribute data during host vehicle highway travel and preparing a fused object attribute data for transmission;
   a vehicle track data sub-module of the communication system module used to independently track the at least one vehicle having the vehicle attribute data;
   an imaging device collecting object imaging data representing objects within a visible detection range of the imaging device;
   an object detection and classification system module having an object classification sub-module used to classify the objects within the visible detection range of the imaging device as a vehicle type or a pedestrian and to output each as an object attribute data, an initial object classification checked on a predefined periodic basis and modified if the object classification changes, the object classification changing if a class confidence level of the object changes when the object changes positions thereby presenting a different view of the object, wherein the object is redefined as a larger vehicle, a smaller vehicle, or as the pedestrian, differing from the initial object classification;
   a target fusion module receiving the object attribute data from the object detection and classification system module, fusing the object attribute data with the vehicle attribute data to create the fused object attribute data, and forwarding the fused object attribute data to the communication system module for transmission to a second vehicle, the second vehicle having an imaging system receiving the object attribute data and identifying objects in the object attribute data, the second vehicle generating travel decisions incorporating the objects positioned within the visible detection range of the imaging device of the first vehicle which are not visible to the second vehicle; and
   a class confidence sub-module wherein an object classification is checked on a predefined periodic basis and modified if the object classification changes by a change in object range, angle of view, and host vehicle or object speed.

15. The motor vehicle system for generating and transmitting imaging object data of claim 14, wherein the object detection and classification system module includes a track list identifying each of the objects identified by the detection sub-module includes:
   a track list in communication with the detection sub-module identifying each of the objects identified by the detection sub-module; and
   an object range estimation sub-module determining a distance (range) of each of the objects identified in the track list with respect to the host vehicle.

16. The motor vehicle system for generating and transmitting imaging object data of claim 14, wherein the object detection and classification system module includes a vehicle VRU sub-module performing analyses of information received from the range estimation sub-module and generating the object attribution data.

17. The motor vehicle system for generating and transmitting imaging object data of claim 16, wherein the object detection and classification system module includes:
   an object classification sub-module acting to identify the object classification for each of the objects defining one of a vehicle or a pedestrian.

18. The motor vehicle system for generating and transmitting imaging object data of claim 14, further including an optical scanning system in an optical scanning sub-module performing optical and stereo imaging of a vehicle or object in a host vehicle predefined sensing and transmission window; and wherein the imaging device defines a camera in communication with the optical scanning sub-module.

19. A method for generating and transmitting motor vehicle imaging object data, comprising:
   positioning a communication system module in a host vehicle for receiving vehicle attribute data during host vehicle highway travel and preparing a fused object attribute data for transmission;
   collecting object imaging data representing objects within a visible detection range of an imaging device;
   classifying the objects within the visible detection range of the imaging device as a vehicle type or a pedestrian and outputting each as an object attribute data;
   modifying the object classification if a class confidence level of the object changes when the object changes positions thereby presenting a different view of the object;
   forwarding the object attribute data from the object detection and classification system module to a target fusion module;
   fusing the object attribute data with the vehicle attribute data to create the fused object attribute data, and forwarding the fused object attribute data to the communication system module for transmission to a second vehicle defining a V2V equipped motor vehicle, the second vehicle having limited data available concerning the objects within the visible detection range of the imaging device, the second vehicle having an imaging system receiving the object attribute data and identifying objects in the object attribute data, the second vehicle generating travel decisions of the second vehicle using objects positioned within the visible detection range of the imaging device of the first vehicle which are not visible to the second vehicle; and
   checking an object classification in a class confidence sub-module on a predefined periodic basis and modifying the object classification if the object classification changes by a change in object range, angle of view, and host vehicle or object speed.

\* \* \* \* \*